3,105,735
PROCESS FOR THE MANUFACTURE OF AMMONIUM PERCHLORATE
Ronald Percy Ayerst, Waltham Abbey, England, assignor to Minister of Aviation in Her Majesty's Government of the United Kingdom of Great Britain and Northern Ireland
Filed July 21, 1961, Ser. No. 125,719
2 Claims. (Cl. 23—85)

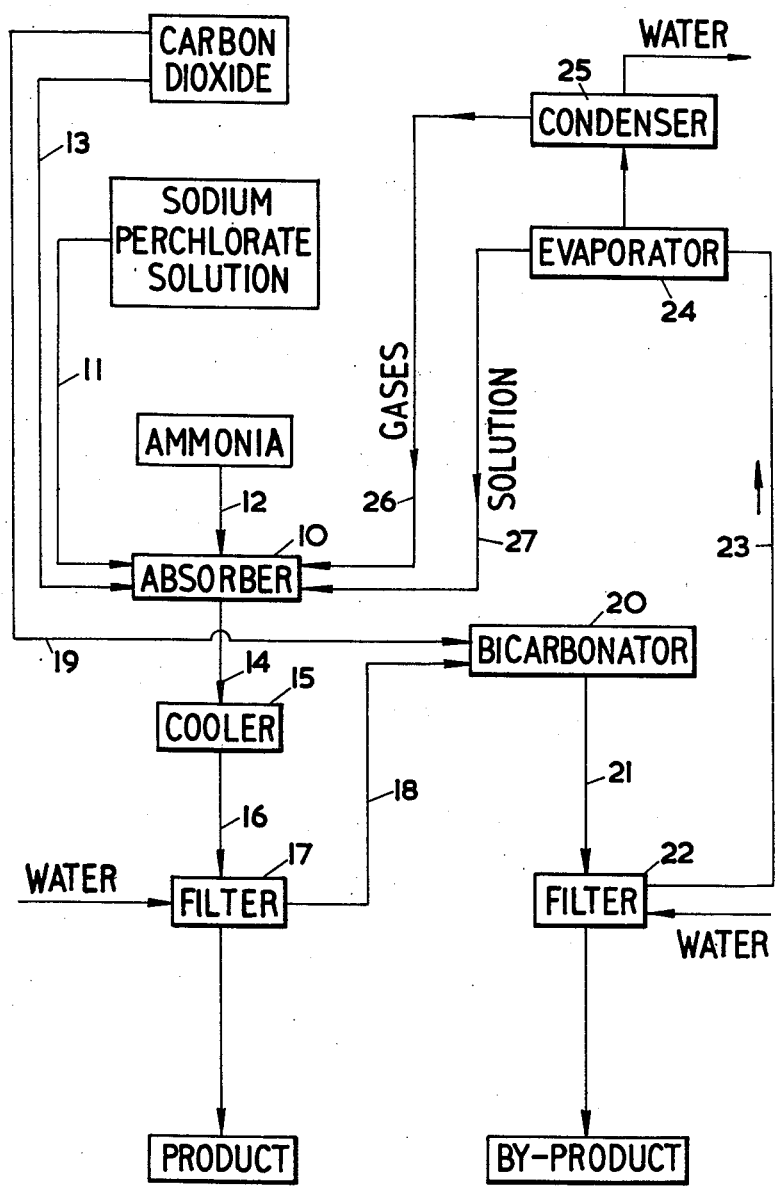

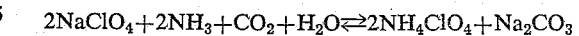

This invention relates to the manufacture of ammonium perchlorate and the object of the invention is to provide an improved process of the kind in which sodium perchlorate is subjected to a double decomposition reaction with an ammonium salt.

Various proposals have been made to use the chloride, sulphate or nitrate as the ammonium salt but these methods have serious drawbacks, for example, corrosion problems when chloride or sulphate are used or the disadvantage of using another reagent to remove sodium nitrate formed as a by-product when nitrate is used in the main reaction.

The present invention consists in an improved process for the manufacture of ammonium perchlorate wherein sodium perchlorate solution is treated with carbon dioxide and ammonia to precipitate ammonium perchlorate. After filtering off the ammonium perchlorate the mother liquor is treated with carbon dioxide to react with sodium carbonate therein and to precipitate sodium bicarbonate. After filtering off the sodium bicarbonate the mother liquor is subjected to evaporation to remove water vapour, ammonia and carbon dioxide, and the residual solution containing sodium perchlorate and ammonium perchlorate is recycled to the initial stage of the process. After removing water, the residual gas mixture containing carbon dioxide and ammonia is also recycled to the initial stage of the process.

The filtered ammonium perchlorate is washed and the wash water added to the mother liquor filtrate. Similarly, the filtered sodium bicarbonate by-product is washed and the wash water added to the mother liquor from the by-product.

The basic idea of the improved process is the utilisation of carbon dioxide throughout the precipitating stages subsequent to an electrolysis of sodium chlorate as, (1) a carrier for the ammonia and (2) a precipitant to reduce the sodium concentration in the system by precipitating the sodium as sodium bicarbonate. Thus the system is maintained at a pH value greater than 7 during the whole process, and no corrosive ions are introduced into the system and thus corrosion problems are avoided. Advantageously, the manufacture may be carried out as a continuous process.

In order that the invention may be readily understood, one method for the production of ammonium perchlorate in accordance with the invention will be described by way of example with reference to the accompanying drawing.

The drawing shows diagrammatically as a flow sheet an arrangement of apparatus for a continuous process comprising three stages. In the first, sodium perchlorate is converted into ammonium perchlorate and separated; in the second, sodium bicarbonate is produced from the mother liquor and separated; and in the third stage the residual liquor and gases are concentrated and recycled for use in the first stage.

In the drawing 10 is an absorber or reactor into which aqueous sodium perchlorate solution is continuously fed through line 11. The aqueous sodium perchlorate may be produced in known manner by the electrolysis of sodium chlorate. Into the same reactor 10 is also fed a stream of ammonia gas through line 12 and a stream of carbon dioxide through line 13. Ammonia and carbon dioxide are absorbed and ammonium perchlorate and sodium carbonate are formed. The reaction is represented by the equation:

$$2NaClO_4 + 2NH_3 + CO_2 + H_2O \rightleftharpoons 2NH_4ClO_4 + Na_2CO_3$$

The system is in equilibrium and does not go to completion.

The reaction is carried out in hot solution, and despite the known volatility of ammonium carbonate it has been found possible to operate at temperatures up to 60° C. The actual temperature used will depend upon the water concentration chosen and whether it is desired to operate with the ammonium perchlorate initially in complete solution. The process may be carried out continuously without any insurmountable difficulty.

The liquor from this stage is passed by a line 14 to a cooler 15 to crystallise the ammonium perchlorate. The cooler may be a scraped surface heat exchanger or a cooling device designed to give a graded crystal size by incorporating a classifying bed. After cooling the liquor is passed by line 16 to a filter 17 which may be a centrifuge and the mother liquor after the separation of the crystals of the product is passed to the next stage through line 18.

This stage includes an absorber 20 into which is fed the mother liquor and the wash water from the filter 17 and also carbon dioxide through line 19 from the supply.

The mother liquor which contains sodium carbonate at a temperature of about 15 to 20° C. is heated and carbon dioxide is absorbed forming sodium bicarbonate as a valuable by-product of the process.

The main reaction in the bicarbonator or absorber 20 is in accordance with the following equation:

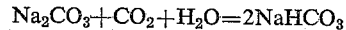

$$Na_2CO_3 + CO_2 + H_2O = 2NaHCO_3$$

Since the sodium carbonate is in equilibrium with ammonium carbonate, ammonium bicarbonate is also formed. Because of its lower solubility, sodium bicarbonate is precipitated even at a temperature of 50° C. if the water concentration of the mixture is correct. The selection of a suitable temperature is governed on the one hand by the improved filtration characteristics at a high temperature and on the other hand by the higher rates of carbon dioxide absorption at lower temperatures. Any temperature between 0° C. and 60° C. is possible but batch experiments have shown that 40–45° C. is preferable. On a continuous basis this temperature may be a little high. The selection of the correct temperature here is of prime importance since a fine precipitate will entail undesirable contamination of the sodium bicarbonate with perchlorate thus reducing the overall efficiency of the process. The sodium bicarbonate formed in the absorber 20 is transferred by line 21 to a filter 22 of known type, filtered hot and washed. The mother liquor and wash water from the filter 22 is passed by line 23 to an evaporator 24.

Water is added continuously to the process initially with the electrolysis liquor in the reactor 10 and is removed subsequently by evaporation in the third stage of the process. However, the evaporation which is carried out in the evaporator 24 cannot be achieved without decomposing the ammonium bicarbonate which is present in the liquors. Evaporation is, therefore, combined with a condenser in the form of a short stripping column 25 which gives water, substantially free from ammonia at the bottom, and ammonia gas, carbon dioxide and water vapor at the top of the column.

The ammonia, carbon dioxide and water vapor recovered from the stripping column 25 are returned by line 26 to the reactor 10 in the first stage to which the evaporated solution from the evaporator 24 containing some sodium perchlorate and ammonium perchlorate is also returned through line 27.

I claim:

1. Process for the production of ammonium perchlorate which comprises treating an aqueous solution of sodium perchlorate with carbon dioxide and gaseous ammonia to form ammonium perchlorate and sodium carbonate, cooling the mother liquor formed by the aqueous solution to crystallize ammonium perchlorate, saturating the mother liquor with carbon dioxide at a temperature of about 0° to 60° C. to precipitate sodium bicarbonate, separating the precipitated sodium bicarbonate from the mother liquor, evaporating the said liquor to remove water and to expel carbon dioxide and gaseous ammonia, condensing and rejecting the said water and recycling carbon dioxide, gaseous ammonia and the residual aqueous solution from the evaporation to the initial stage of the process.

2. A process for the production of ammonium perchlorate which comprises treating an aqueous solution of sodium perchlorate with carbon dioxide and gaseous ammonia at a temperature of about 60° C. to form ammonium perchlorate and sodium carbonate in a mother liquor, cooling the mother liquor to a temperature of about 15° to 20° C. to crystallize and separate the ammonium perchlorate from the mother liquor, saturating the mother liquor with carbon dioxide and warming said liquor to a temperature of about 40° to 45° C. to precipitate sodium bicarbonate, separating the precipitated sodium bicarbonate from said liquor, evaporating said liquor to remove water and to expel carbon dioxide and ammonia, condensing and rejecting said water and recycling carbon dioxide, gaseous ammonia and the residual aqueous solution from the evaporator to the initial stage of the process.

References Cited in the file of this patent
UNITED STATES PATENTS

| | | |
|---|---|---|
| 1,273,477 | Given | July 23, 1918 |
| 1,303,167 | Collett | May 6, 1919 |
| 1,698,722 | Henderson | Jan. 15, 1929 |
| 2,739,873 | Schumacher | Mar. 27, 1956 |